United States Patent [19]
Brooks

[11] Patent Number: 5,452,942
[45] Date of Patent: Sep. 26, 1995

[54] DEVICE FOR LOWERING A DUMP TRUCK BED

[76] Inventor: Louis J. Brooks, 1142 Littlevine Church Rd., Villa Rica, Ga. 30180

[21] Appl. No.: 100,681

[22] Filed: Aug. 2, 1993

[51] Int. Cl.⁶ ..................................................... B60P 1/16
[52] U.S. Cl. ..................... 298/22 C; 180/271; 180/272; 298/20 R
[58] Field of Search ................... 298/19 R, 20 R, 298/21 R, 22 C; 180/53.8, 271, 272

[56] References Cited

U.S. PATENT DOCUMENTS

| | | |
|---|---|---|
| 1,997,104 | 4/1935 | Connors . |
| 3,710,368 | 1/1973 | Hamilton . |
| 3,966,254 | 6/1976 | Guhl et al. . |
| 4,029,359 | 6/1977 | Glomski . |
| 4,508,388 | 4/1985 | Minami . |
| 4,585,356 | 4/1986 | Hudelmaier ............... 180/53.8 |
| 4,688,530 | 8/1987 | Nishikawa et al. ...... 180/53.8 |
| 4,695,710 | 10/1972 | Cresci et al. . |
| 4,898,333 | 2/1990 | Kime et al. ................ 298/22 C |

FOREIGN PATENT DOCUMENTS

| | | | |
|---|---|---|---|
| 52-29015 | 4/1977 | Japan . | |
| 52-31416 | 9/1977 | Japan . | |
| 106825 | 8/1980 | Japan .................. | 298/22 C |
| 59-18033 | 1/1984 | Japan . | |
| 60-151139 | 8/1985 | Japan . | |
| 419241 | 1/1992 | Japan .................. | 298/22 C |
| 1706404 | 1/1992 | U.S.S.R. ............. | 298/22 C |

*Primary Examiner*—Michael S. Huppert
*Assistant Examiner*—Gregory A. Morse
*Attorney, Agent, or Firm*—Jones & Askew

[57] ABSTRACT

A device and method for automatically lowering the bed of a dump truck by disengaging the hydraulic pump and the power take-off when the dump vehicle reaches or exceeds a predetermined speed or when the transmission is shifted to or above a predetermined gear. A conventional dump truck speedometer or transmission system is utilized.

12 Claims, 4 Drawing Sheets

DEVICE FOR LOWERING A DUMP TRUCK BED

TECHNICAL FIELD

This invention relates to a device and method for lowering a dump truck bed. More particularly, this invention relates to a device and method for automatically lowering the bed of a dump truck upon attaining a predetermined speed or gear in operation of the dump truck.

BACKGROUND OF THE INVENTION

In a conventional dump truck, material such as dirt, sand or gravel is transported from one location to another and then "dumped" on the ground. The material is dumped by elevating one end of the dump bed such that the material slides out the other end. The dump bed is elevated by means of a hoist operated by a hydraulic pump. The hydraulic pump is powered by engine power diverted to the pump by means of a power take-off ("PTO"). The PTO is a supplementary mechanism that enables engine power to be used for auxiliary systems on the dump truck, such as the hydraulic pump.

In order to raise the dump bed, the dump truck driver or operator engages the PTO, which diverts engine power to the hydraulic pump. The driver then engages the hydraulic pump which operates the hoist and lifts the dump truck bed. The PTO and the hydraulic pump are engaged by means of a controller generally located in the cab of the truck.

In normal operation, once the dump truck driver has dumped the material at a job site, he is to lower the bed with the hydraulic pump and disengage the PTO before traveling down the highway. It is not uncommon, however, for a driver to leave inadvertently the bed raised or the PTO engaged. In the worst case scenario, the height of the truck with the bed raised may exceed the height of a bridge or other overhead object. Should a dump truck traveling with the bed in the raised position strike a bridge, the damage to the truck, driver and bridge can be significant. Similarly, if the PTO is left engaged it can easily overheat, causing damage to the truck and, on occasion, injury to the driver or bystanders.

Currently known devices disclosed in the literature to disengage automatically the hydraulic pump and the PTO are not adequate for normal dump truck operation. For example, Japanese Patent No. 60-151139 to Toukiyuu Shiyariyou Seizou K.K. discloses a dump truck operation warning device. The PTO is automatically cut off and a warning device is activated after the hydraulic pump has been operated for a certain amount of time while traveling with the PTO engaged.

The disadvantage of this system is that it limits the ability of the dump truck operator to perform certain low speed operations with the bed raised. These operations would include, for example, gravel spreading. A system that is time controlled, i.e., based on the amount of time the hydraulic pump has been operated or the PTO has been engaged, is incompatible with low-speed gravel spreading because it would interrupt the job by automatically lowering the dump bed.

Despite the various efforts found in the prior art, there remains a need for a speed or a gear controlled dump truck system in order to increase safety while at the same time permit low speed operations. Such a system would ensure that the dump truck could not obtain high speed or high gear with the bed raised while maintaining the versatility needed for job site operations.

SUMMARY OF THE INVENTION

The present invention fills the need in the prior art by providing a device and method that automatically disengages the hydraulic pump and the PTO, thereby lowering the dump truck bed, when the truck reaches or exceeds a predetermined speed or gear. The invention permits low speed or low gear operation of the truck with the bed raised to permit gravel spreading or other low speed job site operations. Once the truck exceeds the predetermined speed or gear, the bed is lowered automatically and the manual control means of the hydraulic pump and the PTO cannot be reengaged until the vehicle slows or gears down.

In a preferred embodiment, the invention comprises a mechanical valve, such as a flyweight valve or other type of governor, connected to the speedometer of a dump truck. In this embodiment, the speedometer would operate mechanically.

The mechanical valve controls an air line running from any air tank on the truck, such as that used to operate the pneumatic brakes, to the "control device" located in the cab of the truck. The control device contains the manual control means of the hydraulic pump and the PTO.

The purpose of the invention is to automatically operate these manual control means. This is accomplished within the control device by air cylinders attached to the incoming air lines that force the manual control means to disengage when the mechanical valve is triggered and opens the air lines. When the vehicle reaches or exceeds the predetermined speed as measured by the speedometer, the mechanical valve opens the air lines allowing air from the air tank through the air lines into the air cylinders within the control device. The air cylinders, in a piston-like action, then operate lever and wheel assemblies such that the manual control means for the hydraulic pump and the PTO are disengaged, thereby lowering the dump truck bed. The valve remains open until the truck slows below the predetermined speed, thereby preventing the manual control means of the hydraulic pump and the PTO from being reengaged.

The present invention further includes utilizing the transmission system of a dump truck. For example, in trucks containing a Fuller-brand transmission, characterized by pneumatically assisted shifting, an air line can be run from the air range shifter valve in the transmission system directly to the "control device" in the cab of the truck. Once the transmission is shifted to the predetermined gear, air is released from the air range shifter valve through the air line into the air cylinders within the control device. The invention then operates as described above. Likewise, the manual control means of the hydraulic pump and the PTO cannot be reengaged until the truck is geared down below the predetermined gear.

Other embodiments would include the use of an electric solenoid switch rather than a mechanical valve. The electric solenoid switch would operate in conjunction with an electric speedometer. The invention would then operate as disclosed above.

Further, other possible embodiments would include an all electric system whereby electric motors would replace the air cylinders within the control box. Likewise, any type of motion sensor may be employed as a speed control device. In sum, the invention may operate using mechanized devices, electrical devices, or any combination thereof.

Thus, it is an object of the present invention to provide a device and method for lowering automatically a dump truck bed.

It is a further object to provide a dump truck safety system that automatically lowers the dump truck bed when the truck reaches a predetermined speed or gear.

It is a further object of the present invention to provide a device and method by which the hydraulic pump and the power take off of a dump truck are automatically disengaged when the truck reaches a predetermined speed or gear.

A still further object of the present invention is to prevent the engagement of the hydraulic pump or the power take off of a dump truck until the truck is below a predetermined speed or gear.

Other objects, features, and advantages of the present invention will become apparent upon reading the following specification, when taken in conjunction with the drawings and the claims.

DETAILED DESCRIPTION

Figure 1:
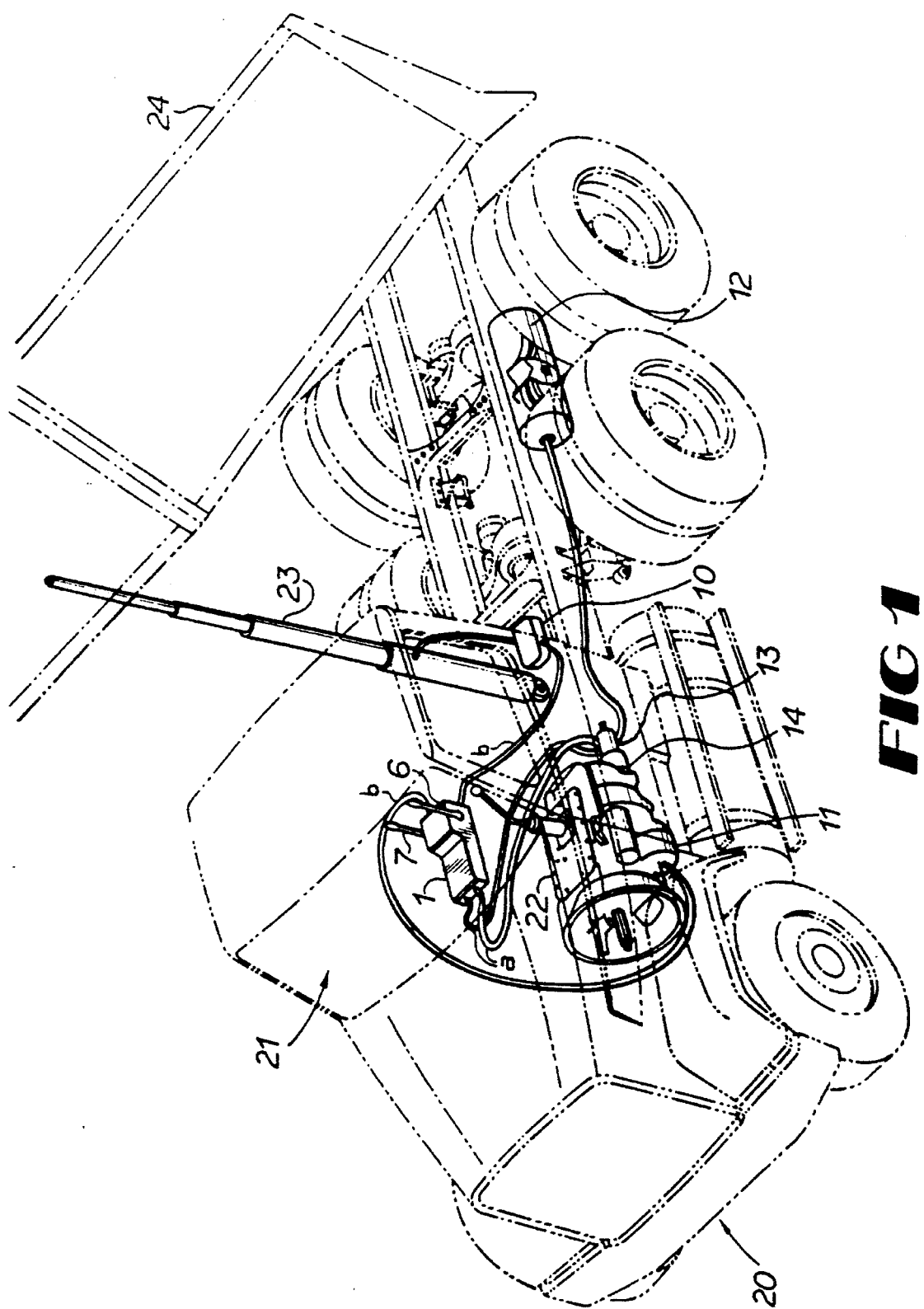
FIG. 1 is a perspective view showing the positioning of the pertinent elements of the invention within a typical dump truck shown in phantom lines.

FIG. 1 is a perspective view showing the positioning of the pertinent elements of the invention within a typical dump truck shown in phantom lines. As can be seen, control device 1 is located in cab 21 of dump truck 20. Dump bed 24 is raised and lowered by hoist 23 which is powered by hydraulic pump 10. The power from engine 22 is transmitted to hydraulic pump 10 via power take-off (PTO) 11. When the manual control means 7 of PTO 11 and manual control means 6 of hydraulic pump 10 are engaged, PTO 11 diverts power from engine 22 to hydraulic pump 10, which operates hoist 23, thereby elevating dump bed 24.

A mechanical valve 13 is functionally connected to speedometer 14 which measures the speed of dump truck 20. The mechanical valve 13 is generally a flyweight valve or other governor-type device. Mechanical valve 13 operates an air line running from air tank 12 to control device 1. Air tank 12 can be any air supply on dump truck 20, such as that used to operate the pneumatic brakes. In this embodiment, speedometer 14 is mechanical, but as explained below, an electrical speedometer may also be employed in the invention.

The control device 1 itself consists of two air cylinders 2 and 3 (not shown in FIG. 1) connected to the incoming air lines (a). Air cylinders 2 and 3 act in a piston-like manner when air is forced in through air lines (a). The air cylinders 2 and 3 operate lever and wheel assemblies 4 and 5 (not shown in FIG. 1) which are attached to the manual control means 6 of the hydraulic pump 10 and the manual control means 7 of the PTO 11.

In normal operation, when the speed of dump truck 20, as measured by speedometer 14, reaches or exceeds a predetermined speed, mechanical valve 13 opens air lines (a), allowing air from air tank 12 through air lines (a) into air cylinders 2 and 3 located within control device 1. For example, the predetermined speed may be 15 to 20 miles per hour. Air cylinders 2 and 3 then operate lever and wheel assemblies 4 and 5 such that manual control means 6 and 7 of hydraulic pump 10 and PTO 11 respectively, are forced to disengage. Once the manual control means 6 and 7 are disengaged, PTO 11 stops transmitting power to hydraulic pump 10 and hydraulic pump 10 loses pressure such that hoist 21 lowers dump bed 24.

Mechanical valve 13 will remain open until the speed of dump truck 20, as measured by speedometer 14, is reduced below the predetermined speed. Until the speed of dump truck 20 is so reduced, the manual control means 6 of the hydraulic pump 10 and the manual control means 7 of the PTO 11 cannot be reengaged.

Figure 2:
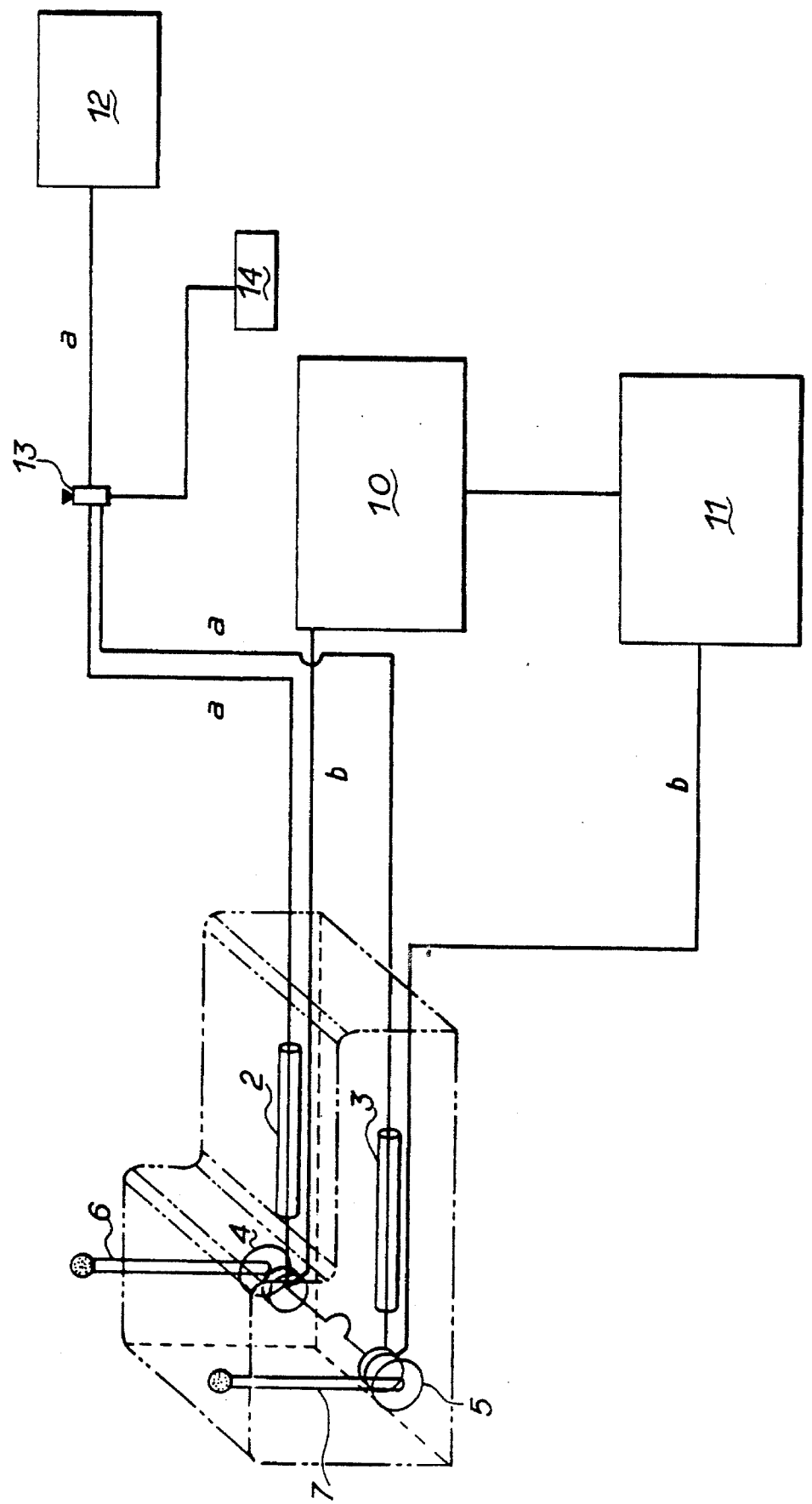
FIG. 2 is a perspective view showing the positioning of the pertinent elements within control device, shown in phantom lines, with the remainder of the invention organized in block form.

FIG. 2 is a perspective view showing the positioning of the pertinent elements within control device 1, shown in phantom lines, with the remainder of the invention organized in block form. As described above, control device 1 contains the manual control means 6 and 7 of hydraulic pump 10 and PTO 11, respectively The manual control means 6 and 7 operate the hydraulic pump 10 and the PTO 11 via cables (b). Likewise as described above, control device 1 is connected to mechanical valve 13 via two air lines (a). Each air line (a) is connected to a corresponding air cylinder 2 and 3. The air cylinders 2 and 3 are of normal construction and act as a piston when air lines (a) open. Air cylinders 2 and 3 are functionally connected to a corresponding one of lever and wheel assemblies 4 and 5. Lever and wheel assemblies 4 and 5 are connected to manual control means 6 and 7 of hydraulic pump 10 and PTO 16. In normal operation, when mechanical valve 13 opens, air from air tank 12 flows through air lines (a) into air cylinders 2 and 3. Air cylinders 2 and 3 fill with air and force lever and wheel assemblies 4 and 5 to disengage manual control means 6 and 7. Once manual control means 6 and 7 are disengaged, PTO 11 stops transmitting power to hydraulic pump 10 and hydraulic pump 10 loses pressure such that hoist 21 is lowered, thereby lowering the dump bed.

In order to install the invention, air lines (a) are run from the air tank 12 to the control device 1. Mechanical valve 13 is inserted in the air lines (a) and functionally connected to the speedometer 14. Cables (b) are then run from the manual control means 6 and 7 of hydraulic pump 10 and PTO 11 contained within control device 1 to the hydraulic pump 10 and PTO 11.

Figure 3:
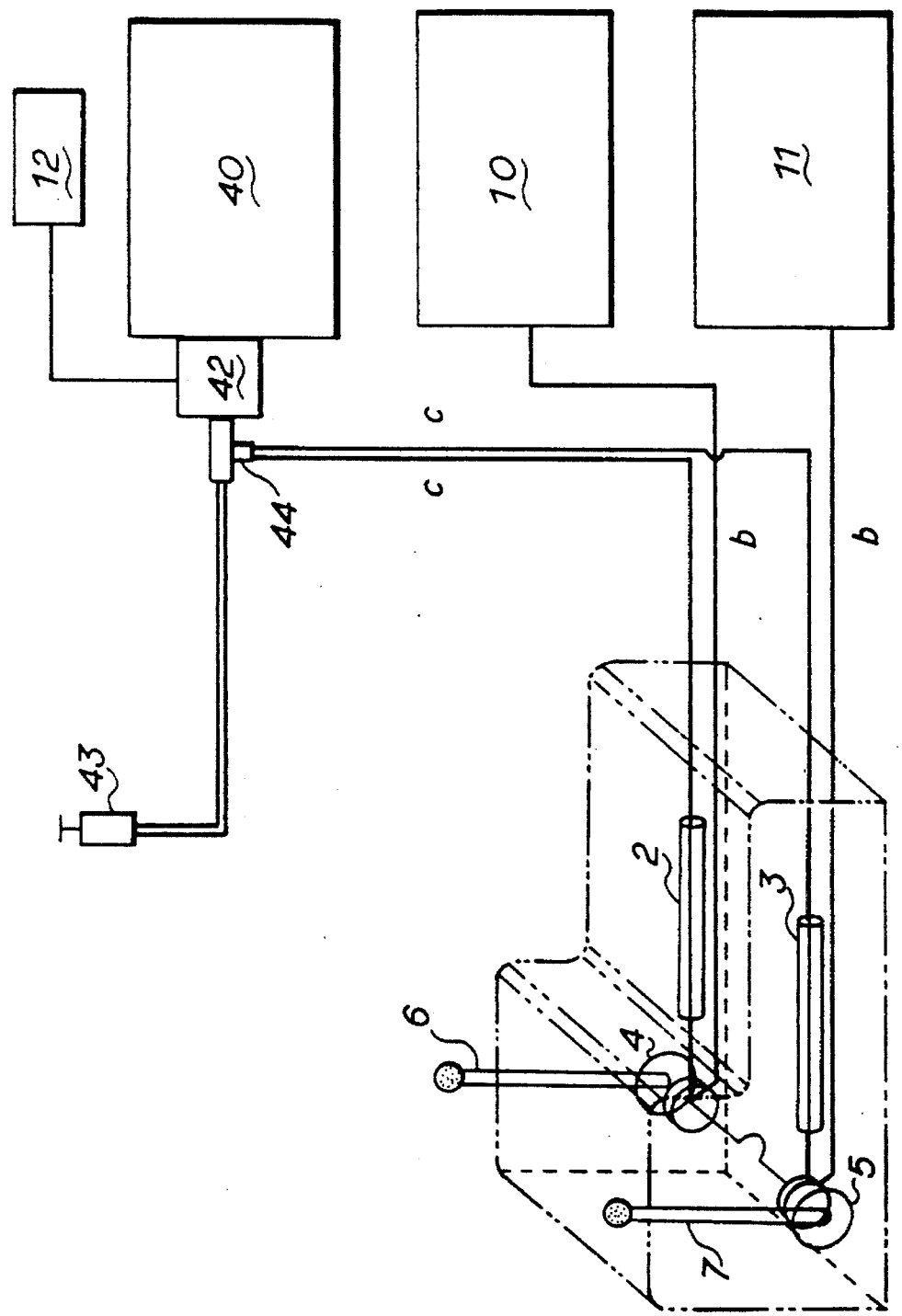
FIG. 3 is a block diagram showing an alternative gear-based embodiment of the invention.

FIG. 3 is a block diagram showing an alterative gear based embodiment of the invention. In trucks employing a Fuller-brand transmission system or the like, the invention may operate based upon a predetermined transmission gear rather than truck speed. Truck transmission 40 selectively operates the powered wheel drive of truck 20 in reverse, neutral and various forward gears by manual gear shifter 43. The transmission 40 is air-assisted such that air from air tank 12 is employed via the air range shifter valve 42 attached to gear shifter 43. Air lines (c) are run from the air range shifter valve 42 via a "T" connection 44 to control device 1.

In normal operation, when gear shifter 43 shifts transmission 40 to or above a predetermined gear, air range shifter valve 42 releases air from air tank 12 into air lines (c) such that the invention is operated as described above. For example, the predetermined gear may be fourth or fifth gear. Likewise, the manual control means and hydraulic pump 10 and PTO 11 cannot be reengaged until the truck is geared down below the predetermined gear.

Figure 4:
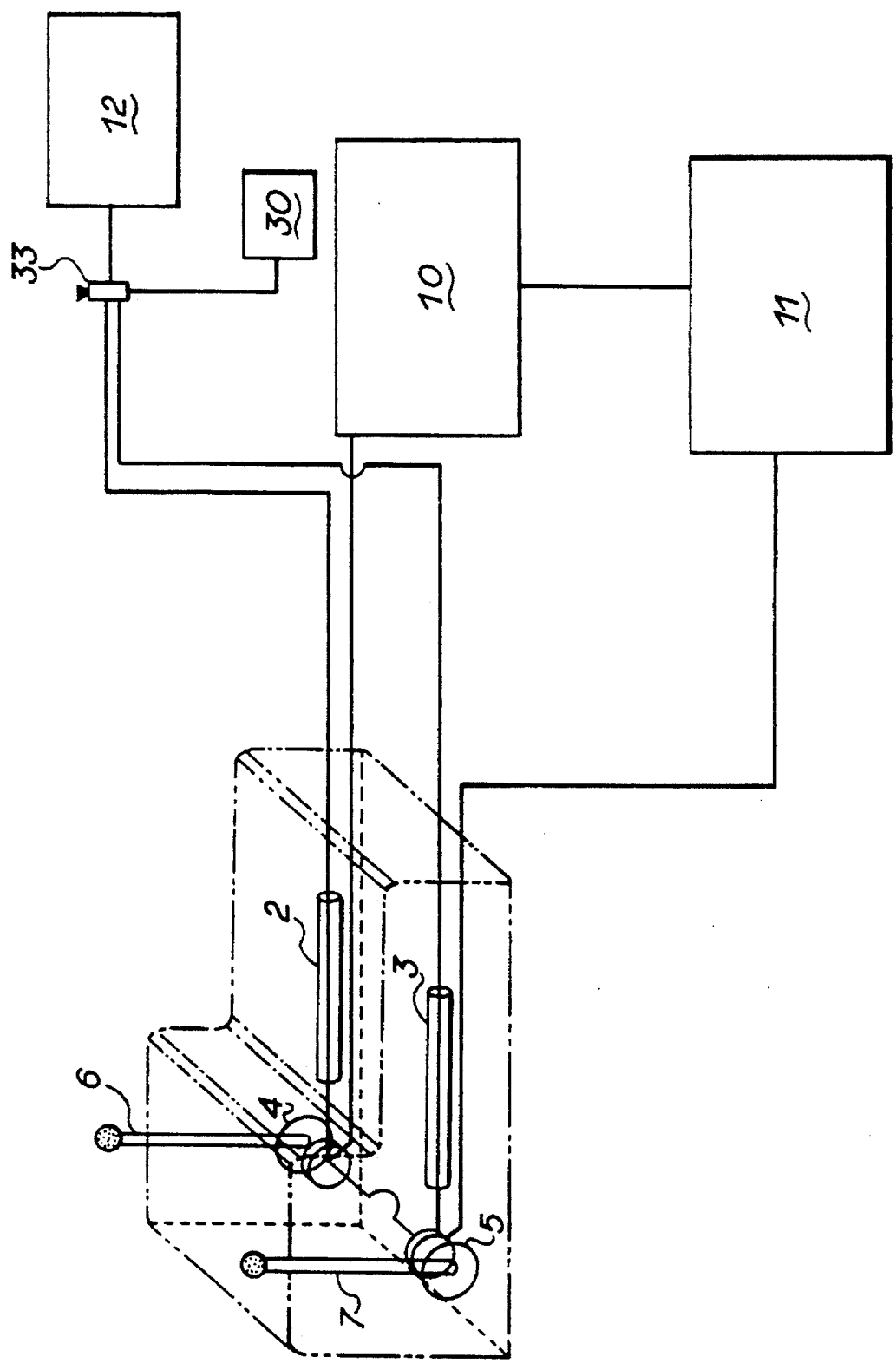
FIG. 4 is a block diagram showing an electrical alternative embodiment of the invention.

FIG. 4 is a block diagram showing an electrical alternative embodiment of the invention. Rather than mechanical speedometer 14 disclosed above, an electric speedometer 30 may be employed. The electric speedometer 30 is connected to an electric solenoid switch 33 rather than the mechanical valve 13. The electric solenoid switch 33 is inserted into air lines (*a*). In normal operation, when dump truck 20 as measured by speedometer 30, reaches or exceeds a predetermined speed, the electric solenoid switch 33 is opened, thereby allowing the invention to operate as described above.

It can be appreciated that the electric solenoid switch 33 also may be triggered at a predetermined gear of the transmission 40 (not shown) or by control means other than speedometer 30 or 13. Similarly, in an alternative to the use of said air tank 12, air lines (*a*) or (*c*) and air cylinders 2 and 3, a fully electric setup (not shown) may be employed. Air cylinders 2 and 3 may be replaced within control device 1 with electric motors connected to the electric solenoid switch 33. Similarly, air tank 12 and air lines (*a*) or (*c*) are replaced with the use of a battery and an electric circuit. When the truck reaches or exceeds a predetermined speed or gear, the electric solenoid switch 33 energizes an electric circuit that causes the electric motors to operate as described above. Further, the electrical setup can be simplified by operating an electric governor directly off transmission 40 such that a governor-activated line powers the electric motors within the control device as described above.

It is to be understood that this description is not meant to be limiting because further modifications may now suggest themselves to those skilled in the art and is intended to cover such modifications as fall within the scope of the following claims.

I claim:

1. An improved dump truck vehicle, comprising:

a dump vehicle including a dump bed whereby material is carried in and dumped from said dump bed;

means for measuring the speed of said dump vehicle; and means responsive to said speed measuring means for automatically lowering said dump bed when said dump vehicle attains a predetermined speed;

said predetermined speed capable of being set.

2. The improved dump vehicle of claim 1 wherein said means for automatically lowering said dump bed further comprises means for controlling said dump bed.

3. The improved dump vehicle of claim 2 wherein said means for controlling said dump bed comprises:

a hydraulic pump to raise and lower said dump bed, including manual control means for selectively operating said hydraulic pump; and a power take-off to power said hydraulic pump, including manual control means for selectively operating said power take-off.

4. The improved dump vehicle of claim 3 wherein said means for measuring the speed of said dump vehicle consists of a mechanical speedometer.

5. The improved dump vehicle of claim 4 wherein said means for controlling said operating means for said dump bed comprises a flyweight valve operating in conjunction with said mechanical speedometer;

said flyweight valve operating the opening and closing of an air line at said predetermined speed of said dump vehicle as measured by said mechanical speedometer;

said air line connected at one end to an air tank and connected to air cylinders at the other end; said air cylinders connected operably to lever and wheel assemblies;

said lever and wheel assemblies connected to said manual control means of said hydraulic pump and said manual control means of said power take-off, such that when the speed of said dump vehicle as measured by said mechanical speedometer reaches or exceeds said predetermined speed, said fly-weight valve opens said air line, releasing air from said air tanks through said air lines into said air cylinders, said air cylinders operating said lever and wheel assemblies such that said manual control means of said hydraulic pump and said manual control means of said power take-off are disengaged, thereby lowering said dump bed.

6. The improved dump vehicle of claim 4 wherein said means responsive to said speed measuring means for automatically lowering said dump bed prevent the operation of said hydraulic pump manual control means and the operation of said power take-off manual control means once the speed of said dump vehicle as measured by said mechanical speedometer is greater than said predetermined speed until the speed of said dump vehicle as measured by said mechanical speedometer is less than said predetermined speed as measured by said mechanical speedometer.

7. The improved dump vehicle of claim 4 wherein said predetermined velocity is 15 to 20 miles per hour.

8. The improved dump vehicle of claim 3 wherein said means for measuring the speed of said dump vehicle is an electrical speedometer.

9. The improved dump vehicle of claim 8 wherein said means for controlling said operating means for said dump bed comprises an electric solenoid switch operating in conjunction with said electrical speedometer;

said electric solenoid switch operating the opening and closing of an air line at said predetermined speed of said dump vehicle as measured by said electrical speedometer;

said air line connected at one end to an air tank and connected to air cylinders at the other end;

said air cylinders connected operably to lever and wheel assemblies;

said lever and wheel assemblies connected to said manual control means of said hydraulic pump and said manual control means of said power take-off such that when the speed of said dump vehicle as measured by said electrical speedometer reaches or exceeds said predetermined velocity, said electric solenoid switch opens said air line, releasing air from said air tank through said air line into said air cylinders, said air cylinders operating said lever and wheel assemblies such that said manual control means of said hydraulic pump and said manual control means of said power take-off are disengaged, thereby lowering said dump bed.

10. The improved dump vehicle of claim 8 wherein said means for controlling said operating means for said dump bed consists of an electric solenoid switch;

said electric solenoid switch operating the energizing of an electric circuit at said predetermined speed of said dump vehicle as measured by said electric speedometer;

said electric circuit connected to a battery and to electric motors;

said electric motors connected operably to lever and wheel assemblies;

said lever and wheel assemblies connected to said manual control means of said hydraulic pump and to said manual control means of said power take-off, such that when the speed of said dump vehicle as measured by said electrical speedometer reaches or exceeds said predetermined speed, said electric solenoid switch said electric circuit, causing said electric solenoids and motors to operate said lever and wheel assemblies such that said manual control means of said hydraulic pump and said manual control means of said power take-off are disengaged, thereby lowering said dump bed.

11. The improved dump vehicle of claim 8 wherein said means responsive to said speed measuring means for automatically lowering said dump bed prevent the operation of said hydraulic pump manual control means and manual operation of said power take-off manual control means once the speed of said dump vehicle as measured by said electrical speedometer is greater than said predetermined speed until the speed of said dump vehicle as measured by said electrical speedometer is less than said predetermined speed as measured by said electrical speedometer.

12. The improved dump vehicle of claim 8 wherein said predetermined velocity is 15 to 20 miles per hour.

* * * * *

UNITED STATES PATENT AND TRADEMARK OFFICE
CERTIFICATE OF CORRECTION

PATENT NO. : 5,452,942
DATED : September 26, 1995
INVENTOR(S) : Louie J. Brooks

It is certified that error appears in the above-indentified patent and that said Letters Patent is hereby corrected as shown below:

On the Title Page, Item [76], "Louis J. Brooks" should read —Louie J. Brooks—.

Column 5, line 60, delete "said operating means for".

Signed and Sealed this

Twelfth Day of December, 1995

Attest:

BRUCE LEHMAN

*Attesting Officer*  *Commissioner of Patents and Trademarks*